United States Patent
Nishikawa

(10) Patent No.: US 11,812,161 B2
(45) Date of Patent: Nov. 7, 2023

(54) FLICKER MEASURING DEVICE, FLICKER MEASURING METHOD, AND FLICKER MEASURING PROGRAM

(71) Applicant: Konica Minolta, Inc., Tokyo (JP)

(72) Inventor: Yoshihiro Nishikawa, Kobe (JP)

(73) Assignee: Konica Minolta, Inc., Tokyo (JP)

( * ) Notice: Subject to any disclaimer, the term of this patent is extended or adjusted under 35 U.S.C. 154(b) by 184 days.

(21) Appl. No.: 17/420,736

(22) PCT Filed: Dec. 19, 2019

(86) PCT No.: PCT/JP2019/049721
§ 371 (c)(1),
(2) Date: Jul. 6, 2021

(87) PCT Pub. No.: WO2020/166201
PCT Pub. Date: Aug. 20, 2020

(65) Prior Publication Data
US 2022/0070355 A1  Mar. 3, 2022

(30) Foreign Application Priority Data

Feb. 12, 2019  (JP) .................. 2019-022667

(51) Int. Cl.
*H04N 23/745* (2023.01)
*H04N 7/01* (2006.01)
*H04N 17/00* (2006.01)

(52) U.S. Cl.
CPC ......... *H04N 23/745* (2023.01); *H04N 7/0132* (2013.01); *H04N 17/004* (2013.01)

(58) Field of Classification Search
CPC .. H04N 23/745; H04N 7/0132; H04N 17/004; H04N 17/04; G09G 3/3614;
(Continued)

(56) References Cited

FOREIGN PATENT DOCUMENTS

WO  2017/038675 A1  3/2017

OTHER PUBLICATIONS

Miyake et al., "Photo-alignment and n-FFS LCD Technologies with IGZO-TFT Applied to Generation Eight Factory", SID 2016 Digest, 2016, pp. 592-595; Cited in Specification.
(Continued)

*Primary Examiner* — Twyler L Haskins
*Assistant Examiner* — Angel L Garces-Rivera
(74) *Attorney, Agent, or Firm* — Rankin, Hill & Clark LLP

(57) ABSTRACT

A flicker measuring device of the present invention: receives light emitted from an object to be measured and outputs a light reception signal corresponding to an amount of received light; acquires the output light reception signal a plurality of times from a measurement start time point to a steady time point at which the object to be measured is in a steady state, obtains a flicker value of the object to be measured for each of the plurality of times on the basis of the acquired light reception signal, and stores the flicker value obtained for each of the plurality of times in a storage in association with an acquisition time point of the light reception signal; and performs an arithmetic processing of obtaining a flicker shift time by using each flicker value stored, in which in the arithmetic processing, an amount of overall change is obtained that is an amount of change of the flicker value from the initial flicker value to the steady flicker value, a predetermined ratio time point is obtained at which an amount of change of the flicker value from the reference flicker value is a predetermined ratio of the amount of overall change, and an elapsed time between the predetermined ratio time point and the reference time point is obtained as the flicker shift time.

22 Claims, 10 Drawing Sheets

| MEASUREMENT POSITION | F(x1,y1) | F(x3,y1) | F(x2,y2) | F(x1,y3) | F(x3,y3) | AVERAGE VALUE | MAXIMUM VALUE | MINIMUM VALUE | VARIATION VALUE |
|---|---|---|---|---|---|---|---|---|---|
| FLICKER VALUE AT MEASUREMENT START TIME POINT [dB] | -34 | -41 | -44 | -31 | -26 | — | — | — | — |
| FLICKER VALUE AT STEADY TIME POINT [dB] | -47 | -46 | -48 | -48 | -47 | — | — | — | — |
| AMOUNT OF CHANGE [dB] | -13 | -5 | -4 | -16 | -21 | — | — | — | — |
| 50% CHANGE VALUE [dB] | -41 | -43 | -46 | -39 | -37 | — | — | — | — |
| 90% CHANGE VALUE [dB] | -46 | -46 | -48 | -46 | -45 | — | — | — | — |
| 50% FLICKER SHIFT TIME [S] | 230 | 340 | 330 | 260 | 140 | 260 | 340 | 140 | 200 |
| 90% FLICKER SHIFT TIME [S] | 1,200 | 1,340 | 1,360 | 1,440 | 1,000 | 1,268 | 1,440 | 1,000 | 440 |

(58) Field of Classification Search
CPC ...... G09G 3/006; G09G 5/00; G09G 2330/12; G01M 11/00; G01J 1/44
See application file for complete search history.

(56) References Cited

OTHER PUBLICATIONS

Huang et al., "Study on the Correlation of Flicker Shift Phenomenon and Ion Accumulation Mechanism in FFS Mode LCD Panel", SID 2017 Digest, 2017, pp. 1834-1837; Cited in Specification.

FIG. 6

| MEASUREMENT POSITION | F(x1,y1) | F(x3,y1) | F(x2,y2) | F(x1,y3) | F(x3,y3) | AVERAGE VALUE | MAXIMUM VALUE | MINIMUM VALUE | VARIATION VALUE |
|---|---|---|---|---|---|---|---|---|---|
| FLICKER VALUE AT MEASUREMENT START TIME POINT [dB] | −34 | −41 | −44 | −31 | −26 | — | — | — | — |
| FLICKER VALUE AT STEADY TIME POINT [dB] | −47 | −46 | −48 | −48 | −47 | — | — | — | — |
| AMOUNT OF CHANGE [dB] | −13 | −5 | −4 | −16 | −21 | — | — | — | — |
| 50% CHANGE VALUE [dB] | −41 | −43 | −46 | −39 | −37 | — | — | — | — |
| 90% CHANGE VALUE [dB] | −46 | −46 | −48 | −46 | −45 | — | — | — | — |
| 50% FLICKER SHIFT TIME [S] | 230 | 340 | 330 | 260 | 140 | 260 | 340 | 140 | 200 |
| 90% FLICKER SHIFT TIME [S] | 1,200 | 1,340 | 1,360 | 1,440 | 1,000 | 1,268 | 1,440 | 1,000 | 440 |

FLICKER MEASURING DEVICE, FLICKER MEASURING METHOD, AND FLICKER MEASURING PROGRAM

TECHNICAL FIELD

The present invention relates to a technology for measuring a flicker occurring in an object to be measured such as a liquid crystal display.

BACKGROUND ART

A flicker measuring device that measures a flicker occurring in a display of an object to be measured such as a liquid crystal display has conventionally been devised (see, for example, Patent Literature 1). Various methods are known as a flicker measurement method. For example, Patent Literature 1 describes a contrast method and a Japan Electronics and Information technology Industries Association (JEITA) method. In addition, an ICDM standard defined by the International Committee for Display Metrology is known.

On the other hand, in recent years, a liquid crystal display has been widely used as a display device. In the liquid crystal display, since the lifetime is shortened when the liquid crystal display is driven by a direct current, the liquid crystal display is driven by an alternating current. In this AC voltage drive, the polarity is inverted for each frame. Examples of a method of applying the AC voltage include a row line inversion drive method, a dot inversion drive method, and the like.

The row line inversion drive method is a method in which the polarity applied to pixels in the row direction is alternately inverted to the positive polarity and the negative polarity for each frame. This method is often used in small liquid crystal displays. The dot inversion drive method is a method in which the polarities applied to pixels adjacent to each other in the row direction and the column direction are alternately inverted to the positive polarity and the negative polarity for each frame. This method is often used in large liquid crystal displays. In Patent Literature 1 described above, a flicker specific to a liquid crystal display is described as follows.

FIGS. 13 and 14 are timing charts schematically illustrating inversion of the polarity applied to a pixel for each frame in a state where the same screen is continuously displayed on the liquid crystal display. In FIGS. 13 and 14, a frame with positive polarity and a frame with negative polarity appear alternately. As illustrated in FIG. 13, in a case where a reference potential is equal to an amplitude center of a waveform of a polarity change, absolute values of levels of video signals are equal to each other between a frame having the positive polarity and a frame having the negative polarity. For this reason, the inversion of the polarity is not sensed by human eyes.

On the other hand, as illustrated in FIG. 14, the reference potential and the amplitude center of the waveform of the polarity change may be different from each other due to manufacturing variations and the like. In this case, the absolute values of the levels of the video signals are different from each other between the frame having the positive polarity and the frame having the negative polarity. For this reason, the video signal changes at a frequency of ½ of a frequency of a vertical synchronization signal. For example, in a case where the frequency of the vertical synchronization signal is 60 Hz, a frequency of the change of the video signal is 30 Hz. Since 30 Hz is less than or equal to the maximum value of a frequency at which the human eyes can respond, it is recognized as flickering of the screen, that is, a flicker, by the human eyes. When the flicker occurs, it is very difficult to see the display. In the liquid crystal display, flicker values generated in respective pixels are often different values from each other due to variations in liquid crystal material characteristics constituting the pixels, differences in wiring connecting a drive circuit and the pixels each other, and the like. That is, the flicker values are spatially different from each other on a display screen of the liquid crystal display.

In recent years, in a liquid crystal display used for a portable device using a battery as a power source, such as a mobile phone, a smartphone, or a tablet computer, a device in which a frequency of a vertical synchronization signal is reduced to less than 60 Hz has been put into practical use to reduce power consumption of the liquid crystal display and extend a battery drive time. However, Non Patent Literature 1 reports that the flicker value increases as the frequency of the vertical synchronization signal decreases in the liquid crystal display. Non Patent Literature 2 reports that the flicker value changes with the lapse of time in the liquid crystal display.

As described above, in the liquid crystal display, the flicker value changes temporally and spatially, and thus, if the change in the flicker value is indicated as it is, it becomes complicated. Thus, it is desirable to more simply represent the temporal change of the flicker value occurring in the object to be measured such as a liquid crystal display.

CITATION LIST

Patent Literature

Patent Literature 1: WO 2017/038675 A

Non Patent Literature

Non Patent Literature 1: Isamu Miyake, etc. "Photo-alignment and n-FFS LCD Technologies with IGZO-TFT Applied to Generation Eight Factory", (US), SID 2016 DIGEST p. 592-595, 2016

Non Patent Literature 2: Kun-Tsai Huang, etc. "Study on the Correlation of Flicker Shift Phenomenon and Ion Accumulation Mechanism in FFS Mode LCD Panel", (US), SID 2017 DIGEST p. 1834-1837, 2017

SUMMARY OF INVENTION

The present invention has been made in view of the above circumstances, and an object thereof is to provide a flicker measuring device, a flicker measuring method, and a flicker measuring program capable of more simply representing a temporal change in a flicker value occurring in an object to be measured.

To achieve the above object, a flicker measuring device reflecting one aspect of the present invention: receives light emitted from an object to be measured and outputs a light reception signal corresponding to an amount of received light; acquires the light reception signal output from the light receiver a plurality of times from a measurement start time point to a steady time point at which the object to be measured is in a steady state, obtains a flicker value of the object to be measured for each of the plurality of times on the basis of the light reception signal acquired, and stores the flicker value obtained for each of the plurality of times in a storage in association with an acquisition time point of the light reception signal; and performs an arithmetic processing of obtaining a flicker shift time by using each flicker value stored in the storage, in which the flicker value obtained at the measurement start time point is defined as an initial flicker value, the flicker value obtained at the steady time point is defined as a steady flicker value, one of the measurement start time point or the steady time point is defined as a reference time point, the initial flicker value or the steady flicker value obtained at the reference time point is defined as a reference flicker value, and in the arithmetic processing, an amount of overall change is obtained that is an amount of change of the flicker value from the initial flicker value to the steady flicker value, a predetermined ratio time point is obtained at which an amount of change of the flicker value from the reference flicker value is a predetermined ratio of the amount of overall change, and an elapsed time between the predetermined ratio time point and the reference time point is obtained as the flicker shift time.

Advantages and features provided by one or a plurality of embodiments of the invention will be fully understood from the detailed description provided below and the accompanying drawings. These detailed description and accompanying drawings are given by way of example only and are not intended as a definition of the limits of the present invention.

BRIEF DESCRIPTION OF DRAWINGS

FIG. 6 is a diagram illustrating the flicker value in FIG. 5, and the like in a tabular form for each measurement position.

DESCRIPTION OF EMBODIMENTS (Knowledge Underlying Present Invention)

Figure 8:
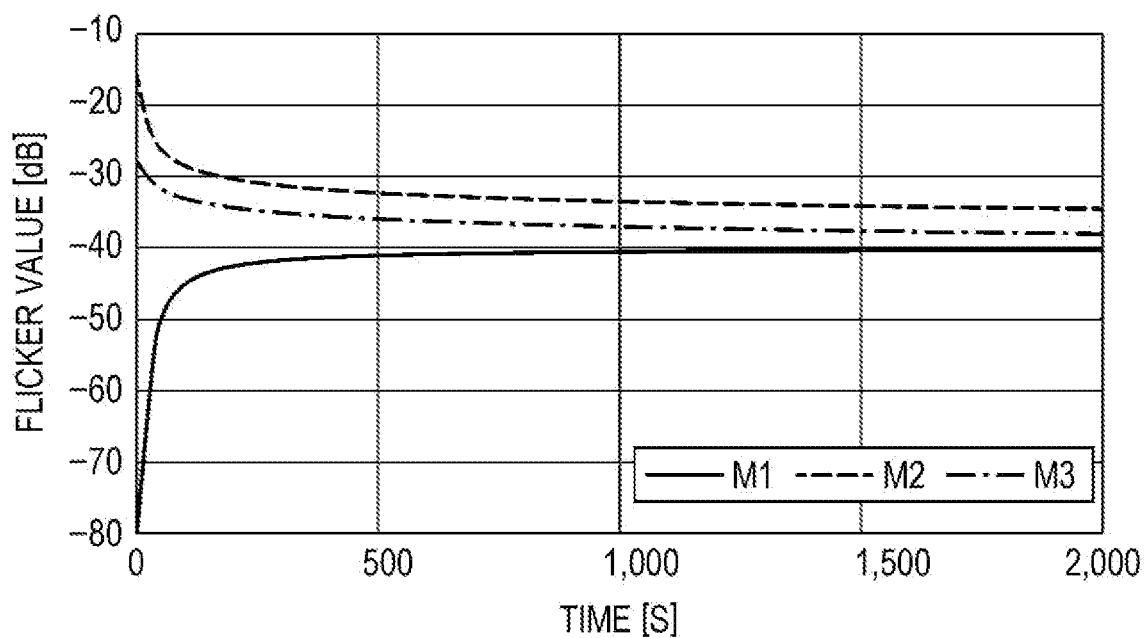
FIG. 8 is a diagram illustrating the temporal change of the flicker value for each of liquid crystal materials.
Figure 9:
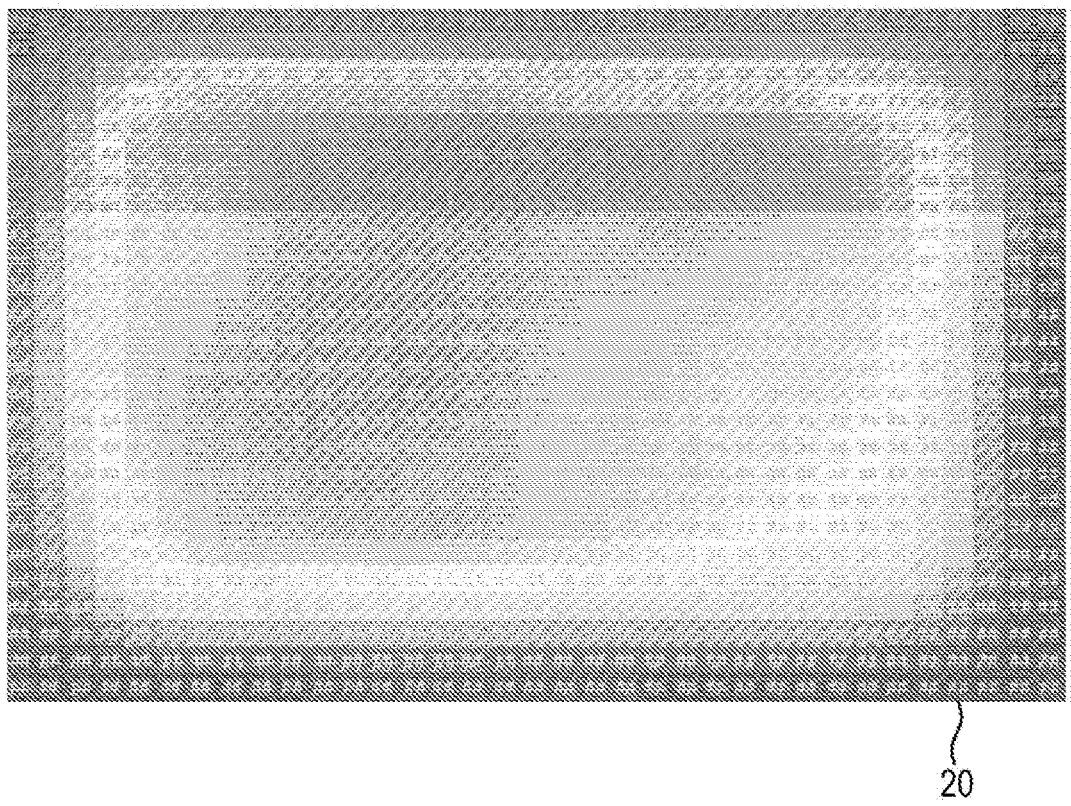
FIG. 9 is a diagram schematically illustrating a spatial distribution of flicker values.
Figure 10:
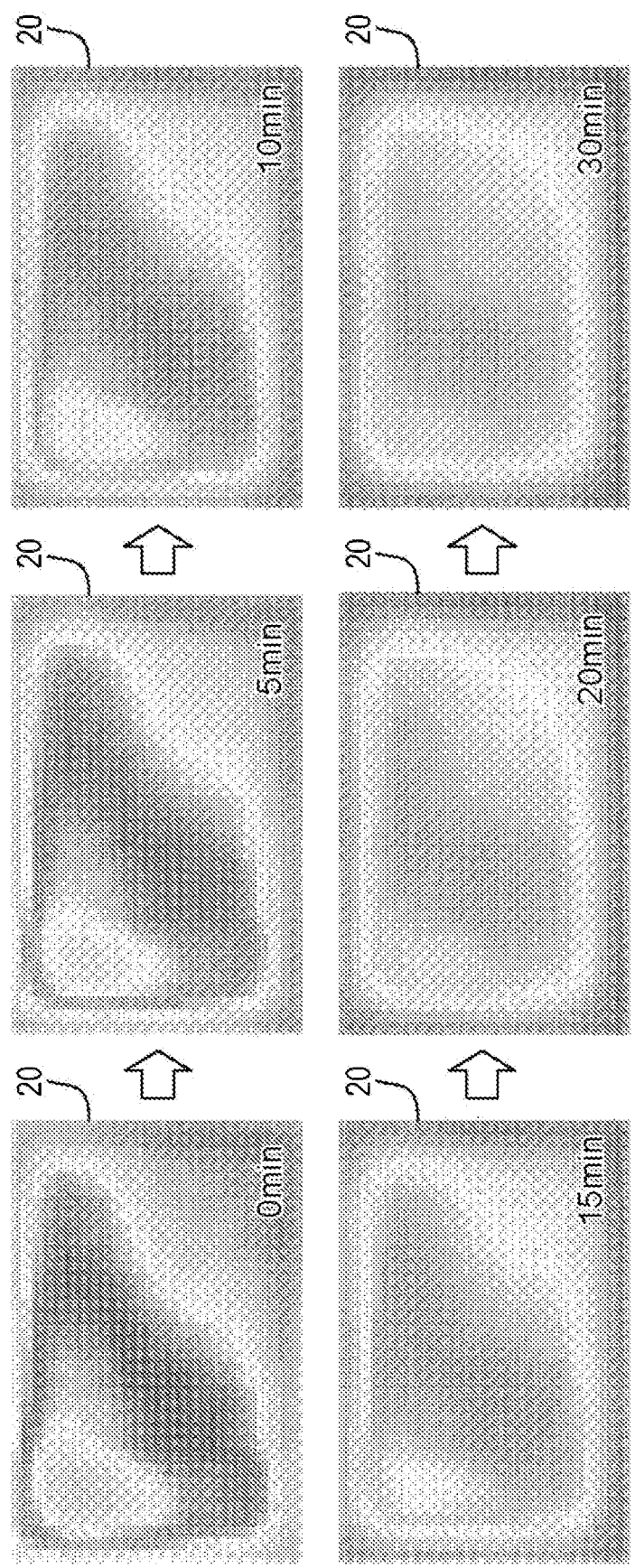
FIG. 10 is a diagram schematically illustrating an example of a temporal change of the flicker values.
Figure 11:
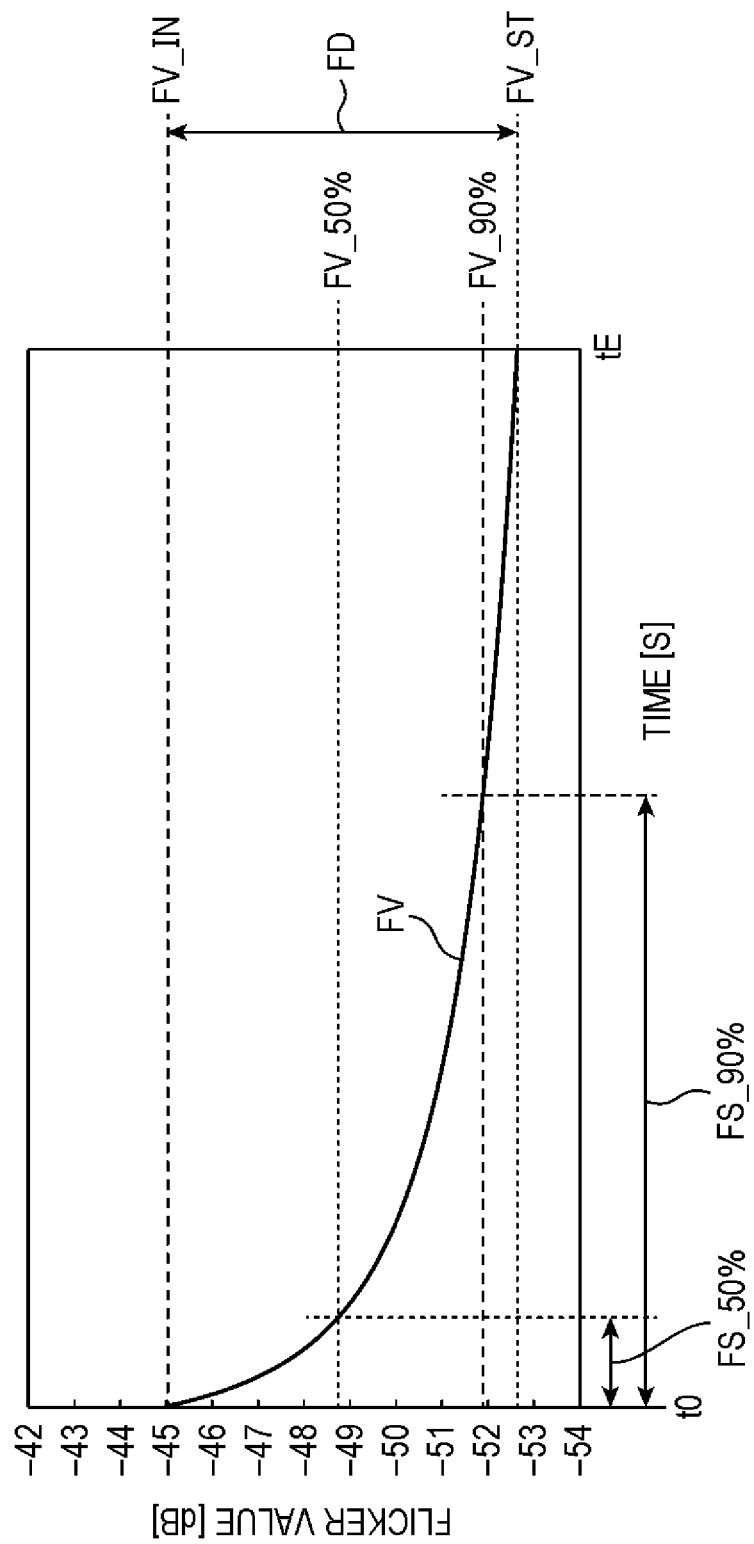
FIG. 11 is a diagram illustrating an example of the temporal change of the flicker value at one measurement position.

FIG. 8 is a diagram illustrating an example of a temporal change of a flicker value in a liquid crystal display for each of liquid crystal materials. In FIG. 8, the horizontal axis represents the time [s], and the vertical axis represents the flicker value [dB]. FIG. 9 is a diagram schematically illustrating an example of a spatial distribution of flicker values in the liquid crystal display. FIG. 10 is a diagram schematically illustrating an example of a temporal change of the flicker values in the liquid crystal display. FIG. 11 is a diagram illustrating an example of the temporal change of the flicker value at one measurement position. In FIG. 11, the horizontal axis represents the time [s], and the vertical axis represents the flicker value [dB]. The knowledge underlying the present invention will be described with reference to FIGS. 8 to 11.

As illustrated in FIG. 8, the flicker value of a liquid crystal material M1 rapidly increases at a measurement start and then gradually increases, while the flicker values of liquid crystal materials M2 and M3 rapidly decrease at the measurement start and then gradually decrease. As illustrated, also in FIG. 8, the flicker value changes temporally as described above, but it can be further seen from FIG. 8 that a state of the temporal change of the flicker value varies for each liquid crystal material.

In FIGS. 9 and 10, the magnitude of the flicker value is indicated by density. That is, in a liquid crystal display 20 of FIGS. 9 and 10, a flicker value [dB] in a high density region on an outer periphery has the highest value, a flicker value [dB] in a low density region on an inner side from the high density region has the next highest value, and a flicker value [dB] in a high density region in the center has the lowest value. As illustrated in FIG. 9, flicker values of the liquid crystal display 20 have a spatial distribution.

In FIG. 10, flicker values at 0 minutes, 5 minutes, 10 minutes, 15 minutes, 20 minutes, and 30 minutes after the measurement start are illustrated. As can be seen from FIG. 10, the flicker values of the liquid crystal display 20 having the spatial distribution also differ in temporal change. As described above, the flicker values have a temporal change and a spatial distribution.

For example, measurement positions in FIGS. 9 and 10 are 30 positions in the y direction (vertical direction) and 40 positions in the x direction (horizontal direction), that is, 1200 positions in total. Thus, when the temporal change of the flicker value in FIGS. 9 and 10 is represented for each measurement position by a curve as illustrated in FIG. 8, 1200 curves are illustrated. For this reason, it is difficult to easily grasp a change in the flicker value in the liquid crystal display 20. Thus, it is desirable to manage the flicker value in the liquid crystal display 20 on the basis of an index that suitably represents a temporal change in the flicker value having a spatial distribution.

In FIG. 11, a flicker value FV_IN (corresponding to an example of an initial flicker value) at a measurement start time point (corresponding to an example of a reference time point) is a flicker value FV at a time point t0, and a flicker value FV_ST (corresponding to an example of a steady flicker value) at a steady time point (corresponding to an example of the reference time point) is a flicker value FV at a time point tE (that is, at a measurement end time). In the present embodiment, it is regarded that a steady state is reached in which the flicker value FV does not change, at the measurement end time. An amount of overall change FD is an amount of change of the flicker value FV from the flicker value FV_IN at the measurement start time point to the flicker value FV_ST at the steady time point, and is obtained by $$FD = FV\_ST - FV\_IN \qquad \text{(Equation 1)}.$$

A 50% change value FV_50% is a flicker value FV at a time point (corresponding to an example of a predetermined ratio time point) when a flicker value of 50% of the amount of overall change FD has changed from the flicker value FV_IN at the measurement start time point. A 90% change value FV_90% is a flicker value FV at a time point (corresponding to an example of the predetermined ratio time point) when a flicker value of 90% of the amount of overall change FD has changed from the flicker value FV_IN at the measurement start time point.

In the example of FIG. 11, FV_IN=−45.00 [dB] and FV_ST=−52.64 [dB]. Thus, by the above (Equation 1), the amount of overall change FD is $$FD=FV\_ST-FV\_IN=-7.64.$$

Accordingly, when rounded off to the third decimal place, the 50% change value FV_50% is $$FV\_50\%=FV\_IN+FD\times0.5=-48.82.$$

When rounded off to the third decimal place, the 90% change value FV_90% is $$FV\_90\%=FV\_IN+FD\times0.9=-51.88.$$

In FIG. 11, a 50% flicker shift time FS_50% is an elapsed time from the measurement start time point to a time point at which the flicker value FV is equal to the 50% change value FV_50%, and a 90% flicker shift time FS_90% is an elapsed time from the measurement start time point to a time point at which the flicker value FV is the 90% change value FV_90%.

The present inventor has conceived of an invention in which the 50% flicker shift time FS_50% and the 90% flicker shift time FS_90% are defined as described above, and the flicker value in the liquid crystal display 20 is managed by them.

Embodiment

Hereinafter, an embodiment of the present invention will be described with reference to the drawings. Note that, in the drawings, the same reference numerals are used for the same components, and the detailed description thereof will be omitted as appropriate.

Figure 1:
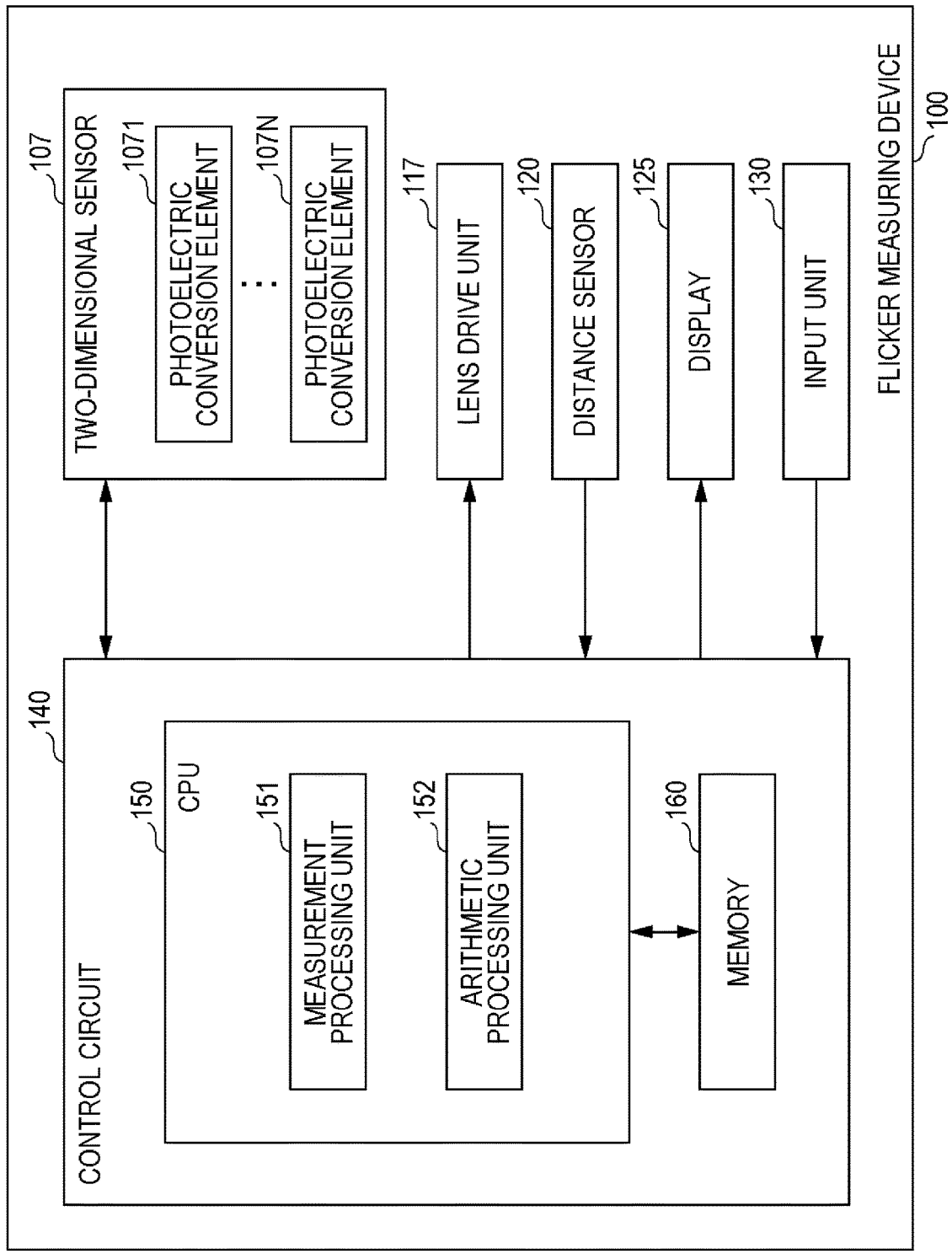
FIG. 1 is a block diagram schematically illustrating an electrical configuration example of a flicker measuring device.
Figure 2:
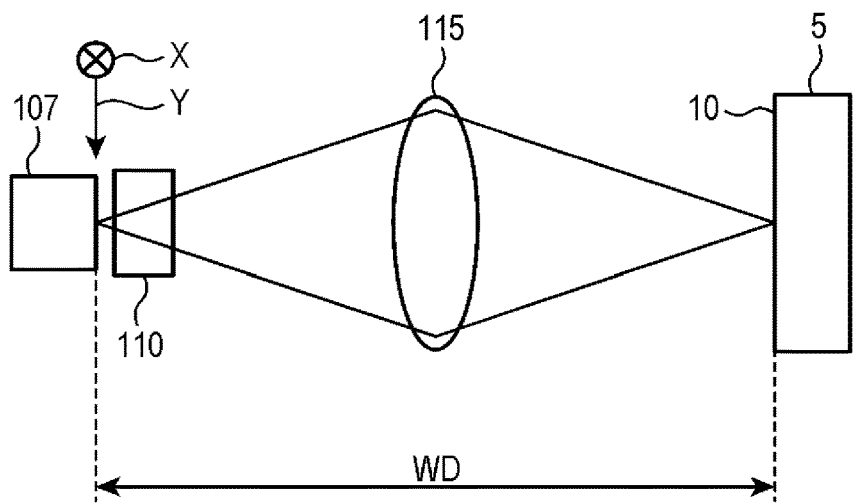
FIG. 2 is a diagram schematically illustrating an optical system of the flicker measuring device.
Figure 3:
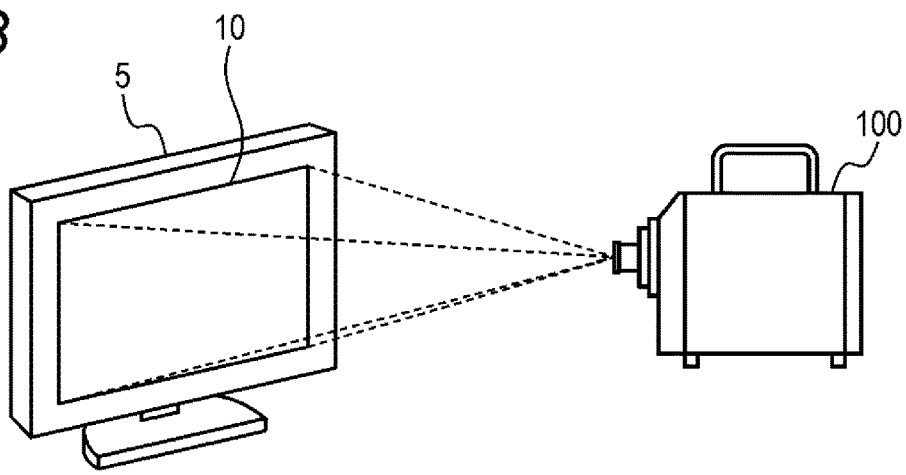
FIG. 3 is a diagram schematically illustrating a flicker measuring state of a part to be measured by the flicker measuring device.
Figure 12:
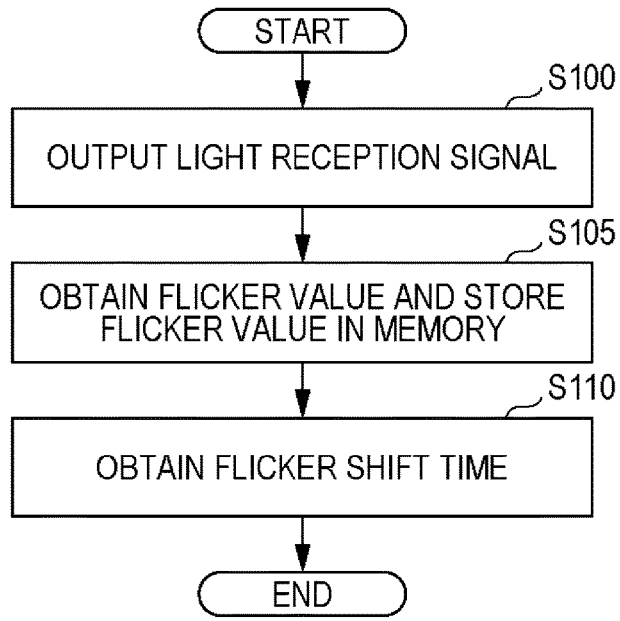
FIG. 12 is a flowchart schematically illustrating an example of a procedure for obtaining a flicker shift time in the flicker measuring device.
Figure 13:
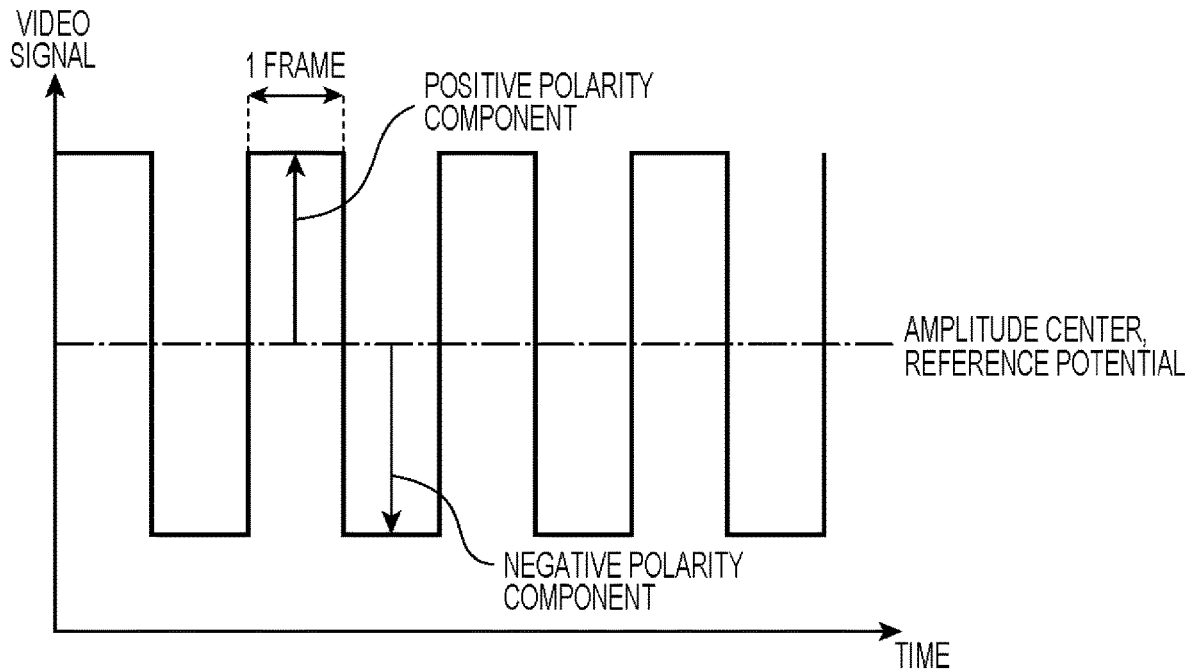
FIG. 13 is a timing chart schematically illustrating inversion of polarity applied to a pixel for each frame.
Figure 14:
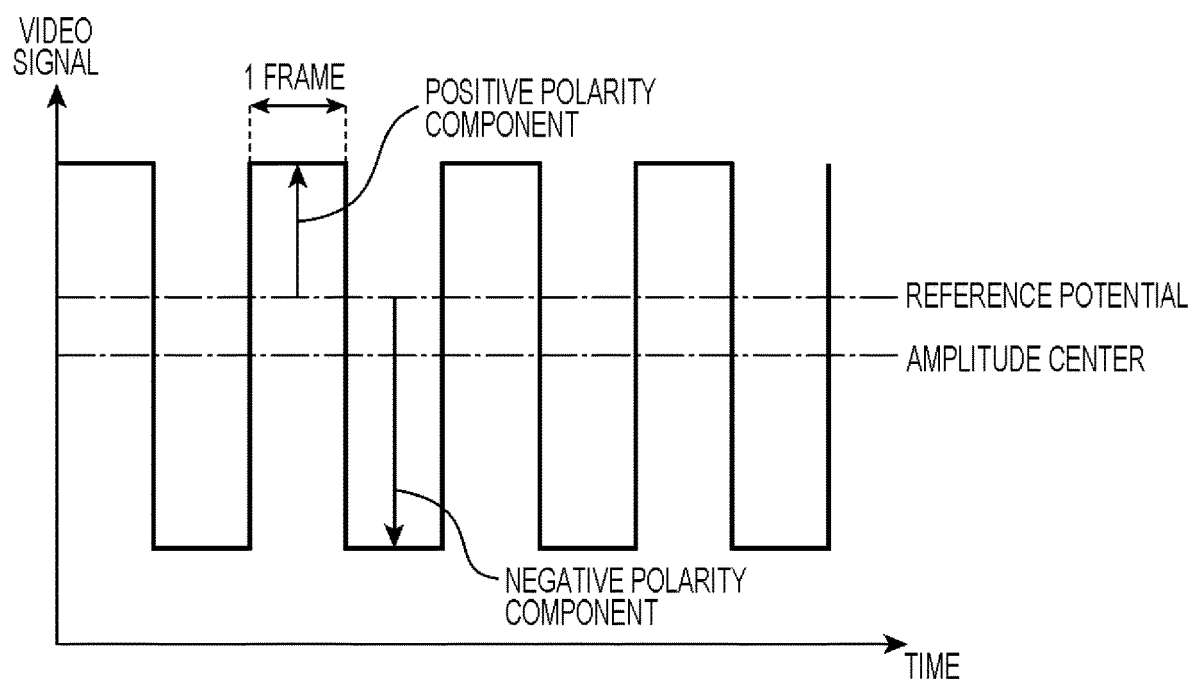
FIG. 14 is a timing chart schematically illustrating inversion of polarity applied to a pixel for each frame.

FIG. 1 is a block diagram schematically illustrating an electrical configuration example of a flicker measuring device of the present embodiment. FIG. 2 is a diagram schematically illustrating an optical system of the flicker measuring device of the present embodiment. FIG. 3 is a diagram schematically illustrating a flicker measuring state of a part to be measured by the flicker measuring device of the present embodiment. FIG. 12 is a flowchart schematically illustrating an example of a procedure for obtaining the flicker shift time in the flicker measuring device.

As illustrated in FIG. 3, a flicker measuring device 100 of the present embodiment measures flickers at a plurality of predetermined measurement positions set in a predetermined two-dimensional region in a display 10 of an object to be measured 5 (in the present embodiment, the entire display 10). As illustrated in FIGS. 1 and 2, the flicker measuring device 100 of the present embodiment includes a two-dimensional sensor 107, an optical filter 110, an optical system 115, a lens drive unit 117, a distance sensor 120, a display 125, an input unit 130, and a control circuit 140. The control circuit 140 includes a central processing unit (CPU) 150, a memory 160, and a peripheral circuit (not illustrated).

The memory 160 (corresponding to an example of a storage) includes, for example, a read-only memory (ROM), a random access memory (RAM), an electrically erasable programmable ROM (EEPROM), and the like. The memory 160 may include, for example, a hard disk drive (HDD). For example, the ROM of the memory 160 stores a control program (corresponding to an example of a flicker measuring program) of the present embodiment for operating the CPU 150. The CPU 150 operates in accordance with the control program of the present embodiment stored in the memory 160, thereby functioning as a measurement processing unit 151 and an arithmetic processing unit 152. Functions of the measurement processing unit 151 and the arithmetic processing unit 152 will be described later.

The two-dimensional sensor 107 (corresponding to an example of a light receiver) includes a plurality of photoelectric conversion elements 1071 to 107N (for example, photodiodes) two-dimensionally arranged in a row direction X and a column direction Y (FIG. 2), and is electrically connected to the control circuit 140. The optical system 115 includes one or a plurality of lenses, and forms an image of the object to be measured 5 on a light receiving surface of the two-dimensional sensor 107. In the present embodiment, the optical filter 110 is arranged between the two-dimensional sensor 107 and the optical system 115. The lens drive unit 117 moves a lens for adjusting a measurement range of the optical system 115 in an optical axis direction of optical system 115.

The photoelectric conversion elements 1071 to 107N of the two-dimensional sensor 107 receive light from a plurality of measurement positions on the display 10 of the object to be measured 5, respectively, the light having passed through the optical system 115 and the optical filter 110, and output a light reception signals corresponding to amounts of received light to the control circuit 140. The two-dimensional sensor 107 is, for example, a complementary metal oxide semiconductor (CMOS) image sensor.

The optical filter 110 has a spectral transmission characteristic that satisfies (spectral sensitivity characteristics of the photoelectric conversion elements 1071 to 107N)×(spectral transmission characteristic of the optical filter 110)

=(spectral responsivity of the two-dimensional sensor 107)

=standard relative visibility $V(\lambda)$  (Equation 2).

The optical filter 110 is an absorption type filter or a vapor deposition type filter, and is formed by a known method to have a spectral transmission characteristic that satisfies the (Equation 2). Note that, in FIG. 2, the optical filter 110 is arranged in front of the two-dimensional sensor 107, but may be arranged between the optical system 115 and the object to be measured 5.

The distance sensor 120 is electrically connected to the control circuit 140, and is controlled by the measurement processing unit 151 to detect WD that is a distance between the object to be measured 5 and the flicker measuring device 100. The distance sensor 120 outputs the detected WD to the control circuit 140. The measurement processing unit 151 operates the lens drive unit 117 depending on the WD detected by the distance sensor 120 to adjust positions in the optical axis direction of one or a plurality of lenses constituting the optical system 115, thereby adjusting the measurement range (angle of view). The distance sensor 120 includes, for example, a laser distance sensor. The distance sensor 120 is not limited to the laser distance sensor, and may include another sensor capable of detecting WD such as an ultrasonic sensor or an infrared sensor.

In the present embodiment, as illustrated in FIG. 2, WD is set to a distance along the horizontal direction between a surface of the display 10 of the object to be measured 5 and the light receiving surface of the two-dimensional sensor 107, but is not limited thereto. Alternatively, WD may be set to a distance along the horizontal direction between the surface of the display 10 of the object to be measured 5 and a surface of a housing of the flicker measuring device 100.

Note that, for example, in a case where the lens drive unit 117 is not provided and the optical system 115 having a fixed angle of view is used, the measurement processing unit 151 may display, on the display 125, a message prompting a user to move the housing of the flicker measuring device 100 close to or away from the object to be measured 5 depending on WD detected by the distance sensor 120.

The display 125 includes, for example, a liquid crystal display panel. The display 125 is controlled by the measurement processing unit 151 of the CPU 150 and displays, for example, a flicker measurement result. Note that, the display 125 is not limited to the liquid crystal display panel, and may include another display panel such as an organic electroluminescence (EL) panel.

The input unit 130 includes an operation button operated by the user, and outputs an operation signal indicating a content of the user's operation to the control circuit 140. The input unit 130 includes a measurement time setting button for setting a measurement time, a measurement start button for giving an instruction for a measurement start, and the like. Note that, in a case where the display 125 is a touch panel display, the touch panel display may also serve as the input unit 130 instead of the operation buttons.

The measurement processing unit 151 of the CPU 150 obtains a flicker value by a predetermined procedure on the basis of the light reception signals output from the photoelectric conversion elements 1071 to 107N of the two-dimensional sensor 107. The measurement processing unit 151 may obtain a flicker value according to the contrast method or the JEITA method described in Patent Literature 1, or may obtain a flicker value according to the ICDM standard described above.

For example, when a measurement time T1 (for example, T1=2000 [s] in the present embodiment) is set by the user using the measurement time setting button of the input unit 130, and the instruction for the measurement start is given by the user using the measurement start button of the input unit 130, the photoelectric conversion elements 1071 to 107N of the two-dimensional sensor 107 respectively start to output the light reception signals (step S100 in FIG. 12). The measurement time T1 is a time from the time point t0 (measurement start time point in FIG. 11) to the time point tE (measurement end time point in FIG. 11). As described above, in the present embodiment, when the measurement time T1 elapses, it is regarded that the steady state is reached in which the flicker value FV of the object to be measured 5 does not change. The user uses the input unit 130 to set the measurement time T1 at which the flicker value FV can be regarded as being in the steady state, depending on a type of the object to be measured 5.

For example, the measurement processing unit 151 acquires the light reception signals output from the photoelectric conversion elements 1071 to 107N of the two-dimensional sensor 107 for each predetermined time T2 (for example, T2=10 seconds in the present embodiment), obtains flicker values for each acquisition of the light reception signals, and stores the obtained flicker values in, for example, the RAM of the memory 160 in association with the measurement time point and the measurement positions (step S105 in FIG. 12). That is, for example, the measurement processing unit 151 stores a flicker value FV(xi, yj, t) in the memory 160. The flicker value FV(xi, yj, t) is a flicker value at a measurement position (xi, yj) and a measurement time point t, and i=1 to Nx and j=1 to Ny. For example, in FIGS. 9 and 10 described above, Nx=40 and Ny=30. When the measurement start time point is t0 and the measurement end time point is tE, the measurement time point t is in a range of t0≤t≤tE, and the measurement time T1 is obtained by T1=tE−t0.

The arithmetic processing unit 152 calculates the 50% flicker shift time and 90% flicker shift time described above from the flicker value obtained by the measurement processing unit 151 (step S110 in FIG. 12). First, the arithmetic processing unit 152 obtains an amount of overall change FD(xi, yj) of the flicker value at the measurement position (xi, yj). In accordance with the above (Equation 1), the amount of overall change FD(xi, yj)
is obtained by $$FD(xi,yj)=FV(xi,yj,tE)-FV(xi,yj,t0).$$

Next, the arithmetic processing unit 152 obtains a 50% flicker shift time FS(xi, yj)_50% and a 90% flicker shift time FS(xi, yj)_90% at the measurement position (xi, yj). As described with reference to FIG. 11, the 50% flicker shift time FS(xi, yj)_50% is an elapsed time from the measurement start time point to a time point at which the flicker value FV(xi, yj) is equal to FV(xi, yj, t0)+0.5×FD(xi, yj), and the 90% flicker shift time FS(xi, yj)_90% is an elapsed time from the measurement start time point to a time point at which the flicker value FV(xi, yj) is equal to FV(xi, yj, t0)+0.9×FD(xi, yj).

Next, the arithmetic processing unit 152 obtains each of an average value AV_50% of the 50% flicker shift time FS(xi, yj)_50% and an average value AV_90% of the 90% flicker shift time FS(xi, yj)_90% at all the measurement positions (xi, yj). These are
obtained by $$AV\_50\%=\Sigma x\Sigma y[FS(xi,yj)\_50\%]/(Nx \times Ny) \qquad \text{(Equation 3)}$$

$$AV\_90\%=\Sigma x\Sigma y[FS(xi,yj)\_90\%]/(Nx \times Ny) \qquad \text{(Equation 4).}$$

In (Equation 3) and (Equation 4), Σx represents addition of flicker values in the x-axis direction, Σy represents addition of flicker values in the y-axis direction, Nx represents the number of measurement positions in the x-axis direction, and Ny represents the number of measurement positions in the y-axis direction.

Next, the arithmetic processing unit 152 obtains each of a maximum value FSmax_50% of the 50% flicker shift time FS(xi, yj)_50% and a maximum value FSmax_90% of the 90% flicker shift time FS(xi, yj)_90% at all the measurement positions (xi, yj). These are
obtained by $$FSmax\_50\%=\max[FS(xi,yj)\_50\%] \qquad \text{(Equation 5)}$$

$$FSmax\_90\%=\max[FS(xi,yj)\_90\%] \qquad \text{(Equation 6).}$$

Next, the arithmetic processing unit 152 obtains each of a minimum value FSmin_50% of the 50% flicker shift time FS(xi, yj)_50% and a minimum value FSmin_90% of the 90% flicker shift time FS(xi, yj)_90% at all the measurement positions (xi, yj). These are obtained by $$FSmin\_50\% = \min[FS(xi, yj)\_50\%] \quad \text{(Equation 7)}$$

$$FSmin\_90\% = \min[FS(xi, yj)\_90\%] \quad \text{(Equation 8)}.$$

Next, the arithmetic processing unit 152 obtains each of a variation value VA_50% of the 50% flicker shift time FS(xi, yj)_50% and a variation value VA_90% of the 90% flicker shift time FS(xi, yj)_90% at all the measurement positions (xi, yj). These are obtained by $$VA\_50\% = FSmax\_50\% - FSmin\_50\% \quad \text{(Equation 9)}$$

$$VA\_90\% = FSmax\_90\% - FSmin\_90\% \quad \text{(Equation 10)}.$$

That is, in the present embodiment, the variation value is defined as a difference between the maximum value and the minimum value.

Next, the arithmetic processing unit 152 displays, on the display 125, each of the average value, the maximum value, the minimum value, and the variation value of the 50% flicker shift time FS(xi, yj)_50% and the 90% flicker shift time FS(xi, yj)_90%.

Figure 4:
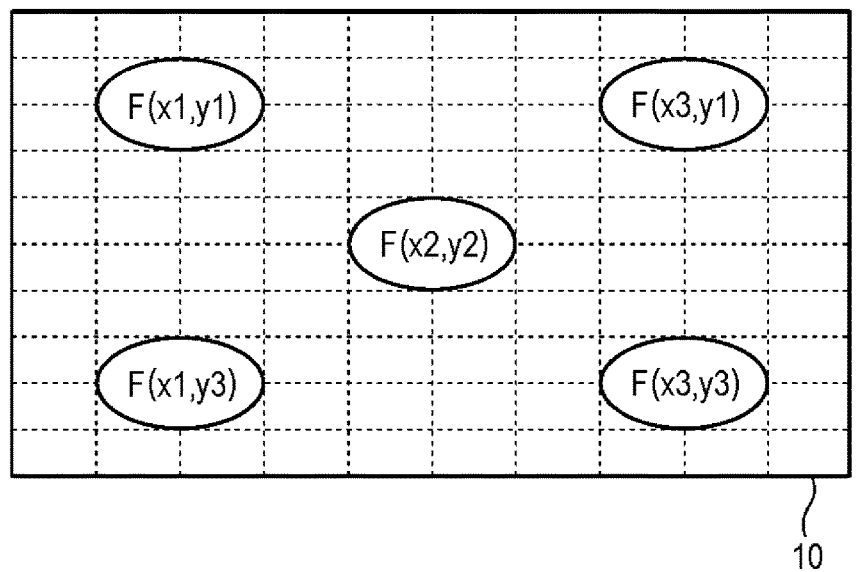
FIG. 4 is a diagram schematically illustrating a specific example of a measurement position on a display.
Figure 5:
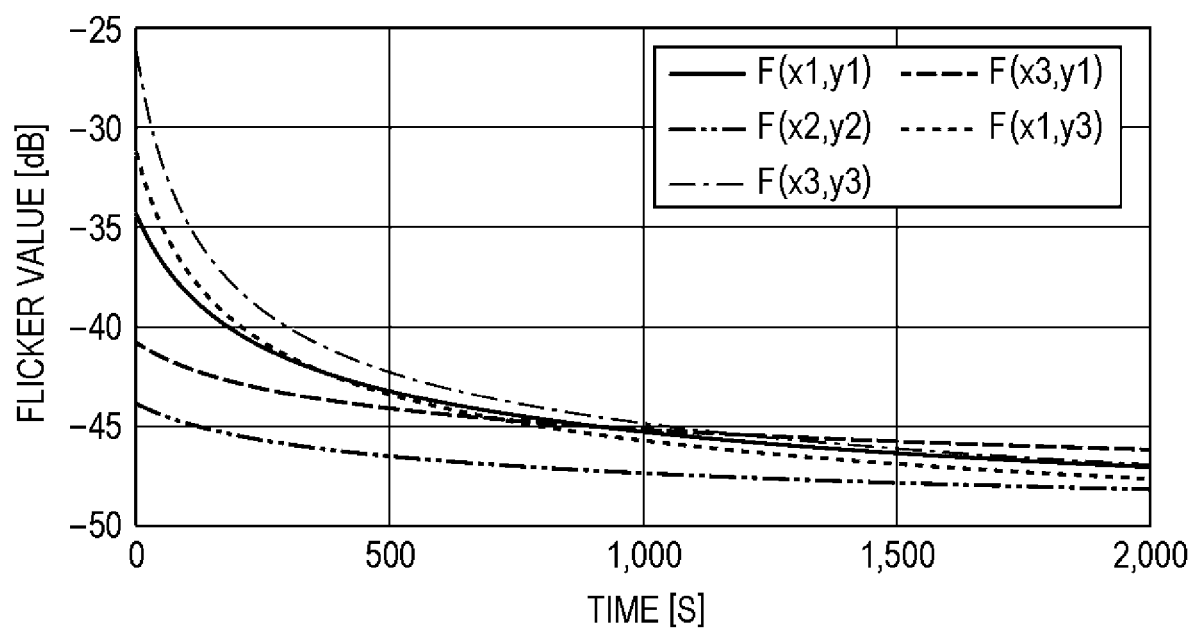
FIG. 5 is a diagram schematically illustrating a specific example of a temporal change of a flicker value at the measurement position illustrated in FIG. 4.

FIG. 4 is a diagram schematically illustrating a specific example of the measurement position on the display 10. FIG. 5 is a diagram schematically illustrating a specific example of the temporal change of the flicker value at the measurement position illustrated in FIG. 4. FIG. 6 is a diagram illustrating the flicker value in FIG. 5, and the like in a tabular form for each measurement position. Specific examples of the 50% flicker shift time FS_50% and the like calculated by the arithmetic processing unit 152 will be described with reference to FIGS. 4 to 6.

In the example of FIG. 4, five measurement positions F(x1, y1), F(x3, y1), F(x2, y2), F(x1, y3), and F(x3, y3) are set. As indicated in FIG. 6, the flicker values FV(xi, yj, t0) at the measurement start time points at the measurement positions measured by the measurement processing unit 151 are −34, −41, −44, −31, and −26 [dB], respectively, when rounded off to the first decimal place, and the flicker values FV(xi, yj, tE) at the steady time points at the measurement positions are −47, −46, −48, −48, and −47 [dB], respectively, when rounded off to the first decimal place.

Thus, as indicated in FIG. 6, the amounts of overall change FD(xi, yj) calculated by the arithmetic processing unit 152 are obtained in accordance with the above (Equation 1), and are −13, −5, −4, −16, and −21 [dB], respectively, when rounded off to the first decimal place.

As indicated in FIG. 6, the 50% change values FV_50%, each of which is the flicker value at the time when the flicker value of 50% of the amount of overall change FD(xi, yj) has changed from the flicker value FV(xi, yj, t0) at the measurement start time point, are −41, −43, −46, −39, and −37 [dB], respectively, when rounded off to the first decimal place. Thus, the 50% flicker times FS(xi, yj)_50% obtained from FIG. 5 are 230, 340, 330, 260, and 140 [s], respectively, as indicated in FIG. 6.

As indicated in FIG. 6, the 90% change values FV_90%, each of which is the flicker value at the time when the flicker value of 90% of the amount of overall change FD(xi, yj) has changed from the flicker value FV(xi, yj, t0) at the measurement start time point, are −46, −46, −48, −46, and −45 [dB], respectively, when rounded off to the first decimal place. Thus, the 90% flicker times FS(xi, yj)_90% obtained from FIG. 5 are 1200, 1340, 1360, 1440, and 1000 [s], respectively, as indicated in FIG. 6.

The average value AV_50% of the 50% flicker shift time FS(xi, yj)_50% is obtained by the above (Equation 3) and is 260 [s] as indicated in FIG. 6. The average value AV_90% of the 90% flicker shift time FS(xi, yj)_90% is obtained by the above (Equation 4) and is 1268 [s] as indicated in FIG. 6.

The maximum value FSmax_50% of the 50% flicker shift time FS(xi, yj)_50% is obtained by the above (Equation 5) and is 340 [s] as indicated in FIG. 6. The maximum value FSmax_90% of the 90% flicker shift time FS(xi, yj)_90% is obtained by the above (Equation 6) and is 1440 [s] as indicated in FIG. 6.

The minimum value FSmin_50% of the 50% flicker shift time FS(xi, yj)_50% is obtained by the above (Equation 7) and is 140 [s] as indicated in FIG. 6. The minimum value FSmin_90% of the 90% flicker shift time FS(xi, yj)_90% is obtained by the above (Equation 8) and is 1000 [s] as indicated in FIG. 6.

The variation value VA_50% of the 50% flicker shift time FS(xi, yj)_50% is obtained by the above (Equation 9) and is 200 [s] as indicated in FIG. 6. The variation value VA_90% of the 90% flicker shift time FS(xi, yj)_90% is obtained by the above (Equation 10) and is 440 [s] as indicated in FIG. 6.

As described above, in the present embodiment, each of the 50% flicker shift time FS(xi, yj)_50% and the 90% flicker shift time FS(xi, yj)_90% is calculated, and each of the average value AV_50% and the average value AV_90% is calculated. Thus, according to the present embodiment, the average value AV_50% of the 50% flicker shift time and the average value AV_90% of the 90% flicker shift time can be used as indices indicating the temporal change in the flicker value of the object to be measured 5. For this reason, the temporal change of the flicker value of the object to be measured 5 can be simply represented. For example, when the temporal change of the flicker value at the plurality of measurement positions is illustrated as it is as illustrated in FIG. 5, the curves of the number of measurement positions overlap and become complicated, but according to the present embodiment, such complication can be avoided.

In the present embodiment, as illustrated in FIG. 11, the 50% flicker shift time FS_50% includes only a time zone in which the flicker value FV rapidly changes, and the 90% flicker shift time FS_90% includes not only the time zone in which the flicker value FV rapidly changes but also a time zone in which the flicker value FV gradually changes. For this reason, according to the present embodiment, by using the 50% flicker shift time FS_50% and the 90% flicker shift time FS_90%, it is possible to represent the temporal change in the flicker value including the features different from each other.

In the present embodiment, a difference between the maximum value and the minimum value of the 50% flicker shift time FS(xi, yj)_50% is calculated as the variation value VA 50%, and a difference between the maximum value and the minimum value of the 90% flicker shift time FS(xi, yj)_90% is calculated as the variation value VA_90%. The large variation values VA_50% and VA_90% mean that the temporal change characteristics of the spatial flicker of the object to be measured 5 are not uniform. Thus, according to the present embodiment, the spatial flicker characteristic of the object to be measured 5 can be easily grasped.

(Others)

(1) In the above embodiment, the 50% flicker shift time FS_50% is defined as an elapsed time from the measurement start time point to a time point at which the flicker value FV is equal to the 50% change value FV_50%. In other words, the 50% flicker shift time FS(xi, yj)_50% is defined as an elapsed time from the measurement start time point to a time point at which the flicker value FV(xi, yj) is equal to FV(xi, yj, t0)+0.5×FD(xi, yj). The 90% flicker shift time FS_90% is defined as an elapsed time from the measurement start time point to a time point at which the flicker value FV is equal to the 90% change value FV_90%. In other words, the 90% flicker shift time FS(xi, yj)_90% is defined as an elapsed time from the measurement start time point to a time point at which the flicker value FV(xi, yj) is equal to FV(xi, yj, t0)+0.9×FD(xi, yj). However, the flicker shift times are not limited to these definitions.

Figure 7:
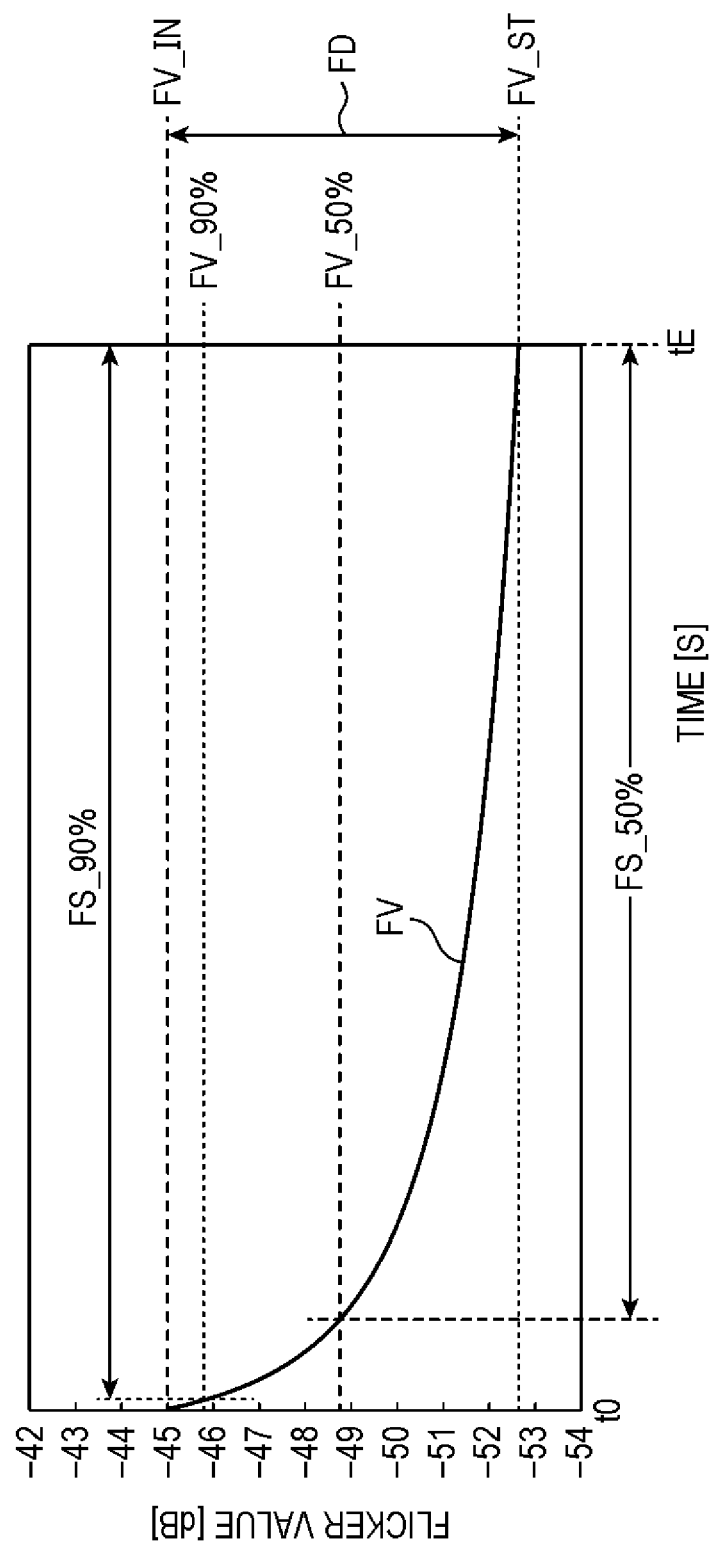
FIG. 7 is a diagram illustrating an example of the temporal change of the flicker value at one measurement position.

FIG. 7 is a diagram illustrating an example of the temporal change of the flicker value at one measurement position. In FIG. 7, the horizontal axis represents the time [s], and the vertical axis represents the flicker value [dB]. With reference to FIG. 7, a different definition of the flicker shift time will be described.

In FIG. 7, unlike the above embodiment, the flicker shift time is defined with the steady time point tE (that is, the measurement end time point) as a starting point. That is, in FIG. 7, the 50% change value FV_50% is the flicker value FV at a time point (corresponding to an example of the predetermined ratio time point) when the flicker value of 50% of the amount of overall change FD has changed with respect to the flicker value FV_ST at the steady time point tE. As can be seen from this definition, the 50% change value FV_50% in the embodiment of FIG. 7 is the same value as the 50% change value FV_50% in the above embodiment (for example, FIG. 11). The 50% flicker shift time FS_50% is an elapsed time from the time point at which the flicker value FV is equal to the 50% change value FV_50% to the steady time point tE (that is, the measurement end time point).

In FIG. 7, the 90% change value FV_90% is the flicker value FV at a time point (corresponding to an example of the predetermined ratio time point) when the flicker value of 90% of the amount of overall change FD has changed with respect to the flicker value FV_ST at the steady time point tE. As can be seen from this definition, a difference between the 90% change value FV_90% and the flicker value FV_IN at the measurement start time point t0 in the embodiment of FIG. 7 is equal to a difference between the 90% change value FV_90% and the flicker value FV_ST at the steady time point tE in the embodiment (for example, FIG. 11). The 90% flicker shift time FS_90% is an elapsed time from the time point at which the flicker value FV is equal to the 90% change value FV_90% to the steady time point tE (that is, the measurement end time point).

According to the definition of FIG. 7, the 50% flicker shift time FS_50% includes only a time zone in which the flicker value FV gradually changes, and the 90% flicker shift time FS_90% includes not only the time zone in which the flicker value FV gradually changes but also a time zone in which the flicker value FV rapidly changes. For this reason, also in the embodiment of FIG. 7, as in the above embodiment, the temporal change of the flicker value including the different features is represented.

(2) In the above embodiment, although the 50% flicker shift time FS_50% is set, the flicker shift time is not limited to 50%, and although the 90% flicker shift time FS_90% is set, the flicker shift time is not limited to 90%. Instead of 50%, for example, it may be within a range of 40 to 60%, and instead of 90%, for example, it may be within a range of 80 to 95%. However, values far apart are preferable because it is considered that the values far apart can express a different characteristic more than values relatively close such as 60% instead of 50% and 80% instead of 90%.

(3) In the above embodiment, the arithmetic processing unit 152 may further display the measurement position (xi, yj) of the maximum value on the display 125. As a result, the user can grasp a position to be improved to reduce the flicker value. The arithmetic processing unit 152 may display the measurement positions (xi, yj) of the maximum value and the minimum value on the display 125. As a result, the user can grasp a position to be improved to reduce the variation in the flicker value.

(4) In the above embodiment, the difference between the maximum value and the minimum value of the 50% flicker shift time FS(xi, yj)_50% is calculated as the variation value VA_50%, and the difference between the maximum value and the minimum value of the 90% flicker shift time FS(xi, yj)_90% is calculated as the variation value VA_90%. Alternatively, a variance or standard deviation of the 50% flicker shift time FS(xi, yj)_50% may be calculated as the variation value, and a variance or standard deviation of the 90% flicker shift time FS(xi, yj)_90% may be calculated as the variation value. However, as in the above embodiment, the difference between the maximum value and the minimum value can easily calculate the variation value in a short time.

(5) In the above embodiment, the measurement time T1 at which the flicker value FV can be regarded as being in the steady state is set by the user, but is not limited thereto. The measurement processing unit 151 may compare the flicker value FV with the previous flicker value FV for each calculation of the flicker value FV, and when an amount of change (difference) is less than or equal to a threshold (for example, 1%), it may be determined that a steady state is reached, and the measurement of the flicker value may be ended.

(6) In the above embodiment, the measurement processing unit 151 obtains the flicker value FV by acquiring the light reception signal of the two-dimensional sensor 107 for each predetermined time T2, but the predetermined time T2 may be changed in the middle. That is, the measurement processing unit 151 may obtain the flicker value FV by acquiring the light reception signal of the two-dimensional sensor 107 for each 10 [s] at the measurement start (for example, from the measurement start to 500 [s] in FIG. 5), and obtain the flicker value FV by acquiring the light reception signal of the two-dimensional sensor 107 for each 30 [s] thereafter (for example, from 500 [s] to 2000 [s] in FIG. 5).

The user may be allowed to set the predetermined time T2 using the input unit 130, and the measurement processing unit 151 may obtain the flicker value FV by acquiring the light reception signal of the two-dimensional sensor 107 for each predetermined time T2 set by the user.

(7) In the above embodiment, for example, the ROM of the memory 160 stores the control program of the above embodiment for operating the CPU 150, but a medium for storing the control program is not limited to the memory 160.

For example, the control program of the above embodiment may be stored in a removable recording medium such as a compact disc (CD)-ROM, a digital versatile disc (DVD), or a universal serial bus (USB) memory. The flicker measuring device 100 may have a configuration capable of reading stored contents of the removable recording medium.

(8) In the above embodiment, the optical filter 110 is included, but the optical filter does not have to be included.

For example, depending on a color displayed on the display 10 of the object to be measured 5, it may not be necessary to match the spectral responsivity of the two-dimensional sensor 107 with the standard relative visibility V(λ), and in that case, the optical filter does not have to be included.

(9) In the above embodiment, the flicker measuring device 100 includes the control circuit 140, but the present invention is not limited thereto. For example, the external personal computer and the flicker measuring device 100 may be configured to be communicable with each other in a wireless or wired manner, and instead of the flicker measuring device 100, the personal computer may include the display 125, the input unit 130, and the control circuit 140. Even in such a configuration, it is possible to obtain the same effect as the above embodiment. The configuration of the flicker measuring device 100 can be simplified.

(10) In the above embodiment, the flicker measuring device 100 is a device that measures flickers at a plurality of predetermined measurement positions set in a predetermined two-dimensional region in the display 10 of the object to be measured 5, but is not limited thereto. The flicker measuring device may be a device that measures a flicker at a single measurement position on the display 10 of the object to be measured 5.

As described above, according to each embodiment, the temporal change of the flicker value in the object to be measured can be more simply represented.

The present specification discloses technologies of various aspects as described above, and main technologies thereof are summarized below.

A flicker measuring device according to a first aspect is a flicker measuring device that measures a flicker of an object to be measured, the flicker measuring device including:

a storage that stores data;

a light receiver that includes a photoelectric conversion element, receives light emitted from the object to be measured, and outputs a light reception signal corresponding to an amount of received light;

a measurement processing unit that acquires the light reception signal output from the light receiver a plurality of times from a measurement start time point to a steady time point at which the object to be measured is in a steady state, obtains a flicker value of the object to be measured for each of the plurality of times on the basis of the light reception signal acquired, and stores the flicker value obtained for each of the plurality of times in the storage in association with an acquisition time point of the light reception signal; and an arithmetic processing unit that obtains a flicker shift time by using each flicker value stored in the storage, in which the flicker value obtained at the measurement start time point is defined as an initial flicker value, the flicker value obtained at the steady time point is defined as a steady flicker value, one of the measurement start time point or the steady time point is defined as a reference time point, the initial flicker value or the steady flicker value obtained at the reference time point is defined as a reference flicker value, and the arithmetic processing unit obtains an amount of overall change that is an amount of change of the flicker value from the initial flicker value to the steady flicker value, obtains a predetermined ratio time point at which an amount of change of the flicker value from the reference flicker value is a predetermined ratio of the amount of overall change, and obtains an elapsed time between the predetermined ratio time point and the reference time point as the flicker shift time.

A flicker measuring method according to a second aspect is a flicker measuring method for measuring a flicker of an object to be measured, the flicker measuring method including:

a signal output step in which a light receiver including a photoelectric conversion element receives light emitted from the object to be measured and outputs a light reception signal corresponding to an amount of received light;

a measurement processing step of acquiring the light reception signal output from the light receiver a plurality of times from a measurement start time point to a steady time point at which the object to be measured is in a steady state, obtaining a flicker value of the object to be measured for each of the plurality of times on the basis of the light reception signal acquired, and storing the flicker value obtained for each of the plurality of times in a storage in association with an acquisition time point of the light reception signal; and an arithmetic processing step of obtaining a flicker shift time by using each flicker value stored in the storage, in which the flicker value obtained at the measurement start time point is defined as an initial flicker value, the flicker value obtained at the steady time point is defined as a steady flicker value, one of the measurement start time point or the steady time point is defined as a reference time point, the initial flicker value or the steady flicker value obtained at the reference time point is defined as a reference flicker value, and in the arithmetic processing step, an amount of overall change is obtained that is an amount of change of the flicker value from the initial flicker value to the steady flicker value, a predetermined ratio time point is obtained at which an amount of change of the flicker value from the reference flicker value is a predetermined ratio of the amount of overall change, and an elapsed time between the predetermined ratio time point and the reference time point is obtained as the flicker shift time.

A flicker measuring program according to a third aspect causes a computer of a flicker measuring device that measures a flicker of an object to be measured to execute:

a signal output step in which a light receiver including a photoelectric conversion element receives light emitted from the object to be measured and outputs a light reception signal corresponding to an amount of received light;

a measurement processing step of acquiring the light reception signal output from the light receiver a plurality of times from a measurement start time point to a steady time point at which the object to be measured is in a steady state, obtaining a flicker value of the object to be measured for each of the plurality of times on the basis of the light reception signal acquired, and storing the flicker value obtained for each of the plurality of times in a storage in association with an acquisition time point of the light reception signal; and an arithmetic processing step of obtaining a flicker shift time by using each flicker value stored in the storage, in which the flicker value obtained at the measurement start time point is defined as an initial flicker value, the flicker value obtained at the steady time point is defined as a steady flicker value, one of the measurement start time point or the steady time point is defined as a reference time point, the initial flicker value or the steady flicker value obtained at the reference time point is defined as a reference flicker value, and in the arithmetic processing step, an amount of overall change is obtained that is an amount of change of the flicker value from the initial flicker value to the steady flicker value, a predetermined ratio time point is obtained at which an amount of change of the flicker value from the reference flicker value is a predetermined ratio of the amount of overall change, and an elapsed time between the predetermined ratio time point and the reference time point is obtained as the flicker shift time.

According to the first aspect, the second aspect, or the third aspect, the plurality of flicker values obtained from the measurement start time point to the steady time point are stored in the storage in association with the acquisition time point of the light reception signal. The amount of overall change is obtained that is the amount of change of the flicker value from the initial flicker value to the steady flicker value. The predetermined ratio time point is obtained at which the amount of change of the flicker value from the reference flicker value is the predetermined ratio of the amount of overall change. The elapsed time between the predetermined ratio time point and the reference time point is obtained as the flicker shift time. Since the flicker shift time is obtained as described above, the temporal change of the flicker value in the object to be measured can be more simply represented.

In the first aspect, for example, the reference time point may be the measurement start time point, the reference flicker value may be the initial flicker value, and the arithmetic processing unit may obtain a predetermined ratio time point at which the amount of change of the flicker value from the initial flicker value is the predetermined ratio of the amount of overall change, and may obtain an elapsed time from the measurement start time point to the predetermined ratio time point as the flicker shift time.

In the first aspect, for example, the reference time point may be the steady time point, the reference flicker value may be the steady flicker value, and the arithmetic processing unit may obtain a predetermined ratio time point at which the amount of change of the flicker value traced back from the steady flicker value is the predetermined ratio of the amount of overall change, and may obtain an elapsed time from the predetermined ratio time point to the steady time point as the flicker shift time.

In the first aspect, for example,
the arithmetic processing unit may obtain a first flicker shift time in which the predetermined ratio is a first ratio, and a second flicker shift time in which the predetermined ratio is a second ratio different from the first ratio.

In this aspect, two types of flicker shift times are obtained in which the predetermined ratios are the first ratio and the second ratio. Thus, according to this aspect, as the two types of flicker shift times, the flicker shift times can be obtained including periods in which the degree of change in the flicker value is different from each other. For this reason, the temporal change of the flicker value in the object to be measured can be more simply represented.

In the first aspect, for example,
the light receiver may include a plurality of the photoelectric conversion elements, and output a plurality of the light reception signals corresponding to the plurality of photoelectric conversion elements, respectively, and the plurality of photoelectric conversion elements may be two-dimensionally arranged, and receive light emitted from respective measurement positions different from each other of the object to be measured, the measurement processing unit may obtain each of flicker values of the measurement positions on the basis of the plurality of light reception signals, and store the flicker values obtained in the storage in association with the respective measurement positions, and the arithmetic processing unit may obtain the flicker shift time at each of the measurement positions.

In this aspect, the flicker shift time at each of the plurality of measurement positions is obtained. Thus, according to this aspect, it is possible to grasp how the temporal change of the flicker value in the object to be measured differs depending on the measurement position.

In the first aspect, for example,
the arithmetic processing unit may obtain at least one of an average value, a maximum value, a minimum value, or a most frequent value of the flicker shift time at the plurality of measurement positions.

According to this aspect, since at least one of the average value, the maximum value, the minimum value, and the most frequent value of the flicker shift time at the plurality of measurement positions is obtained, an index for evaluating the entire object to be measured can be obtained.

In the first aspect, for example,
a display may be further included, and
the arithmetic processing unit may obtain a maximum value and a minimum value of the flicker shift time at the plurality of measurement positions, and display the maximum value, the minimum value, a measurement position of the maximum value, and a measurement position of the minimum value on the display.

In this aspect, the maximum value and the minimum value of the flicker shift time at the plurality of measurement positions and each measurement position thereof are displayed on the display. Thus, according to this aspect, it is possible to grasp the upper and lower positions of the variation in the flicker value of the object to be measured.

In the first aspect, for example,
a display may be further included, and
the arithmetic processing unit may obtain a variation value representing a variation in the flicker shift time on the basis of the flicker shift time at the plurality of measurement positions, and display the variation value on the display.

In this aspect, the variation value representing the variation in the flicker shift time is obtained on the basis of the flicker shift times at the plurality of measurement positions and displayed on the display. Thus, according to this aspect, it is possible to grasp the degree of variation in the temporal change of the flicker value in the object to be measured. The above variation value may be a variance or standard deviation of the flicker shift time at the plurality of measurement positions. Alternatively, the variation value may be the difference between the maximum value and the minimum value of the flicker shift time at the plurality of measurement positions.

In the first aspect, for example, the measurement processing unit may determine that the object to be measured is in the steady state at a time point when a predetermined time has elapsed from the measurement start time point.

According to this aspect, it is possible to more easily determine that the object to be measured is in the steady state.

In the first aspect, for example, the measurement processing unit may calculate a difference between a flicker value based on the light reception signal acquired at a present time and a flicker value based on the light reception signal acquired at a time before the present time, and determine that the object to be measured is in the steady state when the difference calculated is less than or equal to a predetermined threshold.

According to this aspect, it is possible to more accurately determine that the object to be measured is in the steady state.

The embodiments of the present invention have been illustrated and described in detail; however, it is to be understood that they are merely an illustrative example and an actual example, and not restrictive. The scope of the present invention should be interpreted by the wording of the appended claims.

The entire disclosure of Japanese Patent Application No. 2019 022667 filed on Feb. 12, 2019 is incorporated herein by reference in its entirety.

INDUSTRIAL APPLICABILITY

The flicker measuring device, the flicker measuring method, and the flicker measuring program of the present disclosure are used in a device that measures a flicker of an object to be measured.

The invention claimed is:

1. A flicker measuring device that measures a flicker of an object to be measured, the flicker measuring device comprising:
a storage that stores data;
a light receiver that includes a photoelectric conversion element, receives light emitted from the object to be measured, and outputs a light reception signal corresponding to an amount of received light; and
a hardware processor that:
acquires the light reception signal output from the light receiver a plurality of times from a measurement start time point to a steady time point at which the object to be measured is in a steady state, obtains a flicker value of the object to be measured for each of the plurality of times on a basis of the light reception signal acquired, and stores the flicker value obtained for each of the plurality of times in the storage in association with an acquisition time point of the light reception signal;
obtains a flicker shift time by using each flicker value stored in the storage; and
displays the obtained flicker shift time on a display, wherein
the flicker value obtained at the measurement start time point is defined as an initial flicker value,
the flicker value obtained at the steady time point is defined as a steady flicker value,
one of the measurement start time point or the steady time point is defined as a reference time point,
the initial flicker value or the steady flicker value obtained at the reference time point is defined as a reference flicker value, and
the hardware processor obtains an amount of overall change that is an amount of change of the flicker value from the initial flicker value to the steady flicker value, obtains a predetermined ratio time point at which an amount of change of the flicker value from the reference flicker value is a predetermined ratio of the amount of overall change, and obtains an elapsed time between the predetermined ratio time point and the reference time point as the flicker shift time.

2. The flicker measuring device according to claim 1, wherein
the hardware processor obtains a first flicker shift time in which the predetermined ratio is a first ratio, and a second flicker shift time in which the predetermined ratio is a second ratio different from the first ratio.

3. The flicker measuring device according to claim 2, wherein
the light receiver includes a plurality of the photoelectric conversion elements, and outputs a plurality of the light reception signals corresponding to the plurality of photoelectric conversion elements, respectively, and
the plurality of photoelectric conversion elements is two-dimensionally arranged, and receives light emitted from respective measurement positions different from each other of the object to be measured,
the hardware processor obtains each of flicker values of the measurement positions on a basis of the plurality of light reception signals, and stores the flicker values obtained in the storage in association with the respective measurement positions, and
the hardware processor obtains the flicker shift time at each of the measurement positions.

4. The flicker measuring device according to claim 2, wherein
the hardware processor determines that the object to be measured is in the steady state at a time point when a predetermined time has elapsed from the measurement start time point.

5. The flicker measuring device according to claim 2, wherein
the hardware processor calculates a difference between a flicker value based on the light reception signal acquired at a present time and a flicker value based on the light reception signal acquired at a time before the present time, and determines that the object to be measured is in the steady state when the difference calculated is less than or equal to a predetermined threshold.

6. The flicker measuring device according to claim 1, wherein
the light receiver includes a plurality of the photoelectric conversion elements, and outputs a plurality of the light reception signals corresponding to the plurality of photoelectric conversion elements, respectively, and
the plurality of photoelectric conversion elements is two-dimensionally arranged, and receives light emitted from respective measurement positions different from each other of the object to be measured,
the hardware processor obtains each of flicker values of the measurement positions on a basis of the plurality of light reception signals, and stores the flicker values obtained in the storage in association with the respective measurement positions, and the hardware processor obtains the flicker shift time at each of the measurement positions.

7. The flicker measuring device according to claim 6, wherein
the hardware processor obtains at least one of an average value, a maximum value, a minimum value, or a most frequent value of the flicker shift time at the plurality of measurement positions, and
the hardware processor displays the obtained at least one of the average value, the maximum value, the minimum value, or the most frequent value of the flicker shift time at the plurality of measurement positions on the display.

8. The flicker measuring device according to claim 7, further comprising
the display, wherein
the hardware processor obtains a maximum value and a minimum value of the flicker shift time at the plurality of measurement positions, and displays the maximum value, the minimum value, a measurement position of the maximum value, and a measurement position of the minimum value on the display.

9. The flicker measuring device according to claim 7, further comprising
the display, wherein
the hardware processor obtains a variation value representing a variation in the flicker shift time on a basis of the flicker shift time at the plurality of measurement positions, and displays the variation value on the display.

10. The flicker measuring device according to claim 7, wherein
the hardware processor determines that the object to be measured is in the steady state at a time point when a predetermined time has elapsed from the measurement start time point.

11. The flicker measuring device according to claim 7, wherein
the hardware processor calculates a difference between a flicker value based on the light reception signal acquired at a present time and a flicker value based on the light reception signal acquired at a time before the present time, and determines that the object to be measured is in the steady state when the difference calculated is less than or equal to a predetermined threshold.

12. The flicker measuring device according to claim 6, further comprising
the display, wherein
the hardware processor obtains a maximum value and a minimum value of the flicker shift time at the plurality of measurement positions, and displays the maximum value, the minimum value, a measurement position of the maximum value, and a measurement position of the minimum value on the display.

13. The flicker measuring device according to claim 12, further comprising
the display, wherein
the hardware processor obtains a variation value representing a variation in the flicker shift time on a basis of the flicker shift time at the plurality of measurement positions, and displays the variation value on the display.

14. The flicker measuring device according to claim 6, further comprising
the display, wherein
the hardware processor obtains a variation value representing a variation in the flicker shift time on a basis of the flicker shift time at the plurality of measurement positions, and displays the variation value on the display.

15. The flicker measuring device according to claim 6, wherein
the hardware processor determines that the object to be measured is in the steady state at a time point when a predetermined time has elapsed from the measurement start time point.

16. The flicker measuring device according to claim 6, wherein
the hardware processor calculates a difference between a flicker value based on the light reception signal acquired at a present time and a flicker value based on the light reception signal acquired at a time before the present time, and determines that the object to be measured is in the steady state when the difference calculated is less than or equal to a predetermined threshold.

17. The flicker measuring device according to claim 1, wherein
the hardware processor determines that the object to be measured is in the steady state at a time point when a predetermined time has elapsed from the measurement start time point.

18. The flicker measuring device according to claim 1, wherein
the hardware processor calculates a difference between a flicker value based on the light reception signal acquired at a present time and a flicker value based on the light reception signal acquired at a time before the present time, and determines that the object to be measured is in the steady state when the difference calculated is less than or equal to a predetermined threshold.

19. A flicker measuring method for measuring a flicker of an object to be measured,
the flicker measuring method comprising:
by a light receiver including a photoelectric conversion element, receiving light emitted from the object to be measured and outputting a light reception signal corresponding to an amount of received light;
acquiring the light reception signal output from the light receiver a plurality of times from a measurement start time point to a steady time point at which the object to be measured is in a steady state, obtaining a flicker value of the object to be measured for each of the plurality of times on a basis of the light reception signal acquired, and storing the flicker value obtained for each of the plurality of times in a storage in association with an acquisition time point of the light reception signal;
obtaining a flicker shift time by using each flicker value stored in the storage; and
displaying the obtained flicker shift time on a display, wherein
the flicker value obtained at the measurement start time point is defined as an initial flicker value,
the flicker value obtained at the steady time point is defined as a steady flicker value,
one of the measurement start time point or the steady time point is defined as a reference time point, the initial flicker value or the steady flicker value obtained at the reference time point is defined as a reference flicker value, and in the obtaining, an amount of overall change is obtained that is an amount of change of the flicker value from the initial flicker value to the steady flicker value, a predetermined ratio time point is obtained at which an amount of change of the flicker value from the reference flicker value is a predetermined ratio of the amount of overall change, and an elapsed time between the predetermined ratio time point and the reference time point is obtained as the flicker shift time.

20. The flicker measuring method according to claim 19, wherein the light receiver includes a plurality of the photoelectric conversion elements, and outputs a plurality of the light reception signals corresponding to the plurality of photoelectric conversion elements, respectively, the plurality of photoelectric conversion elements is two-dimensionally arranged, and receives light emitted from respective measurement positions different from each other of the object to be measured, and the method further comprises:

obtaining each of flicker values of the measurement positions on a basis of the plurality of light reception signals, and storing the flicker values obtained in the storage in association with the respective measurement positions;

obtaining the flicker shift time at each of the measurement positions;

obtaining at least one of an average value, a maximum value, a minimum value, or a most frequent value of the flicker shift time at the plurality of measurement positions; and displaying the obtained at least one of the average value, the maximum value, the minimum value, or the most frequent value of the flicker shift time at the plurality of measurement positions on the display.

21. A non-transitory recording medium storing a computer readable flicker measuring program causing a computer of a flicker measuring device that measures a flicker of an object to be measured to execute:

by a light receiver including a photoelectric conversion element, receiving light emitted from the object to be measured and outputting a light reception signal corresponding to an amount of received light;

acquiring the light reception signal output from the light receiver a plurality of times from a measurement start time point to a steady time point at which the object to be measured is in a steady state, obtaining a flicker value of the object to be measured for each of the plurality of times on a basis of the light reception signal acquired, and storing the flicker value obtained for each of the plurality of times in a storage in association with an acquisition time point of the light reception signal;

obtaining a flicker shift time by using each flicker value stored in the storage; and displaying the obtained flicker shift time on a display, wherein the flicker value obtained at the measurement start time point is defined as an initial flicker value, the flicker value obtained at the steady time point is defined as a steady flicker value, one of the measurement start time point or the steady time point is defined as a reference time point, the initial flicker value or the steady flicker value obtained at the reference time point is defined as a reference flicker value, and in the obtaining, an amount of overall change is obtained that is an amount of change of the flicker value from the initial flicker value to the steady flicker value, a predetermined ratio time point is obtained at which an amount of change of the flicker value from the reference flicker value is a predetermined ratio of the amount of overall change, and an elapsed time between the predetermined ratio time point and the reference time point is obtained as the flicker shift time.

22. The non-transitory recording medium according to claim 21, wherein the light receiver includes a plurality of the photoelectric conversion elements, and outputs a plurality of the light reception signals corresponding to the plurality of photoelectric conversion elements, respectively, the plurality of photoelectric conversion elements is two-dimensionally arranged, and receives light emitted from respective measurement positions different from each other of the object to be measured, and the computer readable flicker measuring program causes the computer to further execute:

obtaining each of flicker values of the measurement positions on a basis of the plurality of light reception signals, and storing the flicker values obtained in the storage in association with the respective measurement positions;

obtaining the flicker shift time at each of the measurement positions;

obtaining at least one of an average value, a maximum value, a minimum value, or a most frequent value of the flicker shift time at the plurality of measurement positions; and displaying the obtained at least one of the average value, the maximum value, the minimum value, or the most frequent value of the flicker shift time at the plurality of measurement positions on the display.

* * * * *